US011881592B2

(12) United States Patent
Lee et al.

(10) Patent No.: US 11,881,592 B2
(45) Date of Patent: Jan. 23, 2024

(54) ESS MODULE HAVING STRUCTURE CAPABLE OF PREVENTING EXTERNAL EXPOSURE OF FLAME AND ESS PACK INCLUDING THE SAME

(71) Applicant: LG CHEM, LTD., Seoul (KR)

(72) Inventors: Jung-Hoon Lee, Daejeon (KR); Dal-Mo Kang, Daejeon (KR); Min-Ho Kwon, Daejeon (KR); Jeong-O Mun, Daejeon (KR); Jae-Uk Ryu, Daejeon (KR); Jung-Been You, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 362 days.

(21) Appl. No.: 17/268,169

(22) PCT Filed: Dec. 17, 2019

(86) PCT No.: PCT/KR2019/017894
§ 371 (c)(1),
(2) Date: Feb. 12, 2021

(87) PCT Pub. No.: WO2020/179994
PCT Pub. Date: Sep. 10, 2020

(65) Prior Publication Data
US 2021/0320374 A1 Oct. 14, 2021

(30) Foreign Application Priority Data
Mar. 6, 2019 (KR) .................. 10-2019-0025994

(51) Int. Cl.
*H01M 50/375* (2021.01)
*H01M 50/503* (2021.01)
(Continued)

(52) U.S. Cl.
CPC ........... *H01M 50/375* (2021.01); *A62C 2/065* (2013.01); *A62C 3/16* (2013.01); *H01M 10/613* (2015.04);
(Continued)

(58) Field of Classification Search
CPC ............. H01M 50/375; H01M 10/613; H01M 10/647; H01M 10/653; H01M 10/6555;
(Continued)

(56) References Cited

U.S. PATENT DOCUMENTS

| 2008/0220320 A1 | 9/2008 | Horikoshi et al. |
| 2012/0003520 A1 | 1/2012 | Lee et al. |

(Continued)

FOREIGN PATENT DOCUMENTS

| CN | 104919623 A | * | 9/2015 | ............. C09K 21/00 |
| CN | 208522006 U | * | 2/2019 | ............. Y02E 60/10 |

(Continued)

OTHER PUBLICATIONS

International Search Report (PCT/ISA/210) issued in PCT/KR2019/017894, dated Apr. 1, 2020.
(Continued)

*Primary Examiner* — Kaity V Chandler
(74) *Attorney, Agent, or Firm* — Birch, Stewart, Kolasch & Birch, LLP

(57) ABSTRACT

An Energy Storage System (ESS) module includes a cell stack assembly including a cell stack formed by stacking a plurality of battery cells and a plurality of mica barrier assemblies and a pair of bus bar frames coupled to both side portions of the cell stack; and a housing configured to accommodate the cell stack assembly and having a plurality of flow path holes formed at locations corresponding to a front side, a rear side and both side portions of the cell stack assembly, wherein the mica barrier assembly is provided
(Continued)

between adjacent battery cells and at an outermost side of the cell stack to form a flow path along a stacking direction of the cell stack at a temperature lower than a reference temperature and to block the flow path at a temperature equal to or higher than the reference temperature.

11 Claims, 13 Drawing Sheets

(51) Int. Cl.
  *H01M 50/507*  (2021.01)
  *H01M 50/211*  (2021.01)
  *H01M 10/658*  (2014.01)
  *H01M 10/6566*  (2014.01)
  *H01M 10/6556*  (2014.01)
  *H01M 10/653*  (2014.01)
  *H01M 10/613*  (2014.01)
  *H01M 10/647*  (2014.01)
  *H01M 10/6555*  (2014.01)
  *H01M 50/291*  (2021.01)
  *H01M 50/293*  (2021.01)
  *H01M 50/367*  (2021.01)
  *H01M 50/383*  (2021.01)
  *A62C 3/16*  (2006.01)
  *A62C 2/06*  (2006.01)

(52) U.S. Cl.
  CPC ....... *H01M 10/647* (2015.04); *H01M 10/653* (2015.04); *H01M 10/658* (2015.04); *H01M 10/6555* (2015.04); *H01M 10/6556* (2015.04); *H01M 10/6566* (2015.04); *H01M 50/211* (2021.01); *H01M 50/291* (2021.01); *H01M 50/293* (2021.01); *H01M 50/367* (2021.01); *H01M 50/383* (2021.01); *H01M 50/503* (2021.01); *H01M 50/507* (2021.01)

(58) Field of Classification Search
  CPC ......... H01M 10/6556; H01M 10/6566; H01M 10/658; H01M 50/211; H01M 50/291; H01M 50/293; H01M 50/367; H01M 50/383; H01M 50/503; H01M 50/507; H01M 10/6554; H01M 50/105; H01M 50/184; H01M 10/0481; H01M 10/6557; H01M 50/186; H01M 50/264; H01M 10/6563; H01M 50/35; H01M 50/251; H01M 50/258; H01M 10/627; H01M 50/24; H01M 2220/10; A62C 2/065; A62C 3/16; Y02E 60/10; Y02P 70/50
  See application file for complete search history.

(56) References Cited

U.S. PATENT DOCUMENTS

| 2014/0336397 | A1 | 11/2014 | Yang et al. |
| 2015/0104693 | A1 | 4/2015 | Dorsch |
| 2016/0233465 | A1 | 8/2016 | Lee et al. |
| 2016/0254507 | A1 | 9/2016 | Bull et al. |
| 2018/0026296 | A1 | 1/2018 | Kruger et al. |

FOREIGN PATENT DOCUMENTS

| CN | 110459715 A | * | 11/2019 | ........ H01M 10/6556 |
| EP | 3 259 800 A1 | | 12/2017 | |
| EP | 3 598 564 A1 | | 1/2020 | |
| JE | 10-2018-0080813 A | | 7/2018 | |
| JP | H10294128 A | * | 11/1998 | ............ Y02E 60/10 |
| JP | 2008-218210 A | | 9/2008 | |
| KR | 10-2010-0027731 A | | 3/2010 | |
| KR | 10-1298232 B1 | | 8/2013 | |
| KR | 10-2013-0099875 A | | 9/2013 | |
| KR | 10-2015-0005940 A | | 1/2015 | |
| KR | 10-1543477 B1 | | 8/2015 | |
| KR | 10-2016-0016600 A | | 2/2016 | |
| KR | 10-2016-0041311 A | | 4/2016 | |
| KR | 10-2017-0034560 A | | 3/2017 | |
| KR | 20180026946 A | * | 3/2018 | .......... H01M 50/211 |
| WO | WO 2018/166216 A1 | | 9/2018 | |

OTHER PUBLICATIONS

Extended European Search Report for European Application No. 19918102.5, dated Aug. 19, 2021.

* cited by examiner

ESS MODULE HAVING STRUCTURE CAPABLE OF PREVENTING EXTERNAL EXPOSURE OF FLAME AND ESS PACK INCLUDING THE SAME

TECHNICAL FIELD

The present application claims priority to Korean Patent Application No. 10-2019-0025994 filed on Mar. 6, 2019 in the Republic of Korea, the disclosures of which are incorporated herein by reference.

The present disclosure relates to an ESS module having a structure capable of preventing external exposure of flame and an ESS pack including the ESS module, and more particularly, to an ESS module having a structure capable of effectively preventing external exposure of flame generated therein while easily discharging gas caused by venting of a battery cell, and an ESS pack including the ESS module.

BACKGROUND ART

An ESS (Energy Storage System) module is designed based on UL9450A regulations to cope with a fire test. In the fire test according to the UL9450A regulations, a battery cell inside the ESS module must be heated using a heating pad at a heating rate of 5 to 7 degrees per minute to cause a thermal runaway of the battery cell.

In addition, in order to satisfy the UL9450A regulations, when the thermal runaway phenomenon occurs, only gas generated by venting is discharged to the outside of the ESS module, and the flame generated therein must not be exposed to the outside.

However, if the ESS module adopts air cooling as a cooling method, a flow path is formed along a stacking direction of the battery cells for smooth flow of air, and if a thermal runaway phenomenon occurs at a specific battery cell, heat and flame are easily propagated to adjacent battery cells along the flow path.

Moreover, when a thermal runaway phenomenon occurs due to an increase in temperature of the battery cell, gas generation caused by venting of the battery cell is accompanied beforehand. Since a greater issue such as an increase in flame or explosion due to an increase in internal pressure of the ESS module does not happen only when the gas is smoothly discharged to the outside, the ESS module must be equipped with a structure capable of smoothly discharging gas.

Accordingly, there is a need to develop an ESS module having a structure capable of smoothly cooling a battery cell therein and smoothly discharging gas generated by venting of the battery cell in normal use and simultaneously capable of preventing flame generated in some battery cells from propagating to adjacent battery cells to the maximum.

DISCLOSURE

Technical Problem

The present disclosure is designed to solve the problems of the related art, and therefore the present disclosure is directed to providing an ESS module having a structure capable of smoothly cooling a battery cell therein and smoothly discharging gas generated by venting of the battery cell in normal use and simultaneously capable of preventing flame generated in some battery cells from propagating to adjacent battery cells to the maximum.

However, the technical problem to be solved by the present disclosure is not limited to the above, and other objects not mentioned herein will be understood from the following description by those skilled in the art.

Technical Solution

In one aspect of the present disclosure, there is provided an ESS (Energy Storage System) module, comprising: a cell stack assembly including a cell stack formed by stacking a plurality, of battery cells and a plurality of mica barrier assemblies and a pair of bus bar frames coupled to both side portions of the cell stack; and a housing configured to accommodate the cell stack assembly and having a plurality of flow path holes formed at locations corresponding to a front side, a rear side and both side portions of the cell stack assembly, wherein one of the mica barrier assemblies is provided between adjacent battery cells and at an outermost side of the cell stack to form a flow path along a stacking direction of the cell stack at a temperature lower than a reference temperature and to block the flow path at a temperature equal to or higher than the reference temperature.

Each of the mica barrier assemblies may include a mica barrier having a flow path groove formed on at least one of a top end and a bottom end thereof; and a first expandable graphite sheet configured to fill a part of the flow path groove, the first expandable graphite sheet being expanded at a temperature equal to or higher than the reference temperature to fully fill the flow path groove.

The battery cell may be a pouch-type battery cell and have sealing tapes attached to both widthwise side portions thereof.

The ESS module may further comprise a pair of pressing plates provided in close contact with the side portions of the cell stack in the stacking direction to press the cell stack and fixed to the pair of bus liar frames.

The housing may include a lower housing having a lower plate configured to cover a lower portion of the cell stack assembly, a front plate configured to cover a front portion of the cell stack assembly and a rear plate configured to cover a rear portion of the cell stack assembly; and an upper housing having an upper plate configured to cover an upper portion of the cell stack assembly and a pair of side plates configured to cover the side portions of the cell stack assembly.

The ESS module may further comprise a mesh barrier assembly interposed between the front plate and the cell stack assembly and between the rear plate and the cell stack assembly.

The mesh barrier assembly may include a mesh barrier having a coupling groove formed on at least one of a top end and a bottom end thereof; and a second expandable graphite sheet coupled to the mesh barrier while filling the coupling groove, the second expandable graphite sheet having a plurality of flow path holes and being expanded at a temperature equal to or higher than the reference temperature so that the plurality of flow path holes disappear.

The ESS module may further comprise a mesh plate interposed between each of the side plates and the cell stack assembly.

The ESS module may further comprise a first mica plate interposed between the cell stack and each of the mesh plates and arranged in parallel to the mesh plate, the first mica plate having a plurality of flow path holes.

The ESS module may further comprise a second mica plate disposed between the cell stack and each of the mesh plates and disposed perpendicular to the mesh plate to partition an inner space of the bus bar frame.

Meanwhile, in another aspect of the present disclosure, there is also provided an ESS pack, comprising a plurality of ESS modules according to an embodiment of the present disclosure.

Advantageous Effects

According to an embodiment of the present disclosure, it is possible to smoothly cool a battery cell therein and smoothly discharge gas generated by venting of the battery cell in normal use and simultaneously to delay/prevent that flame generated in some battery cells propagates to adjacent battery cells.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Figure 1:
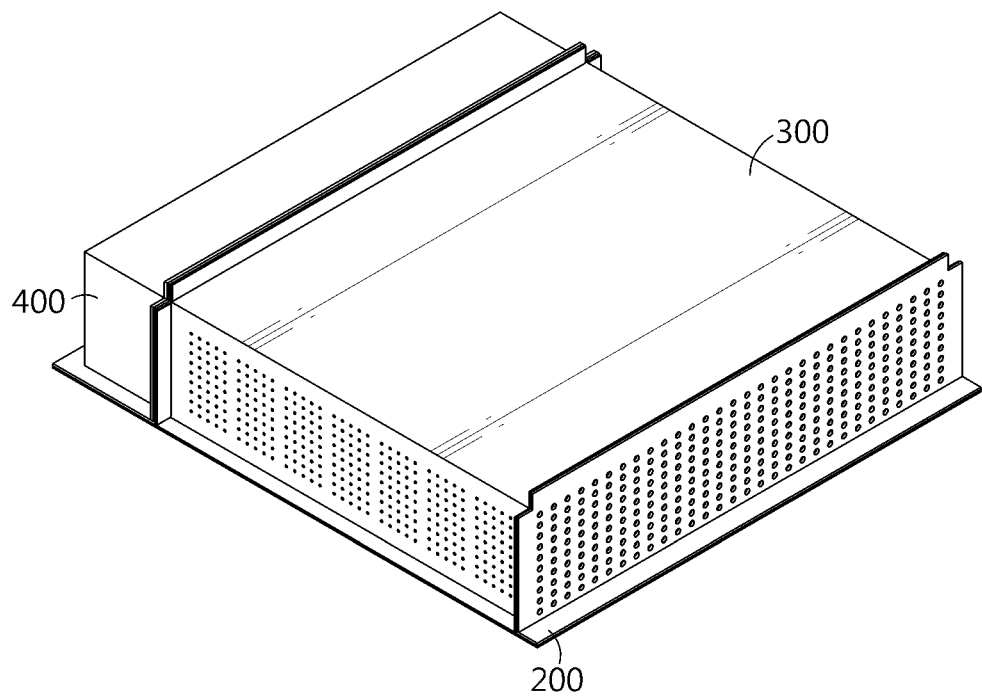
FIG. 1 is a perspective view showing an ESS module according to an embodiment of the present disclosure.
Figure 2:
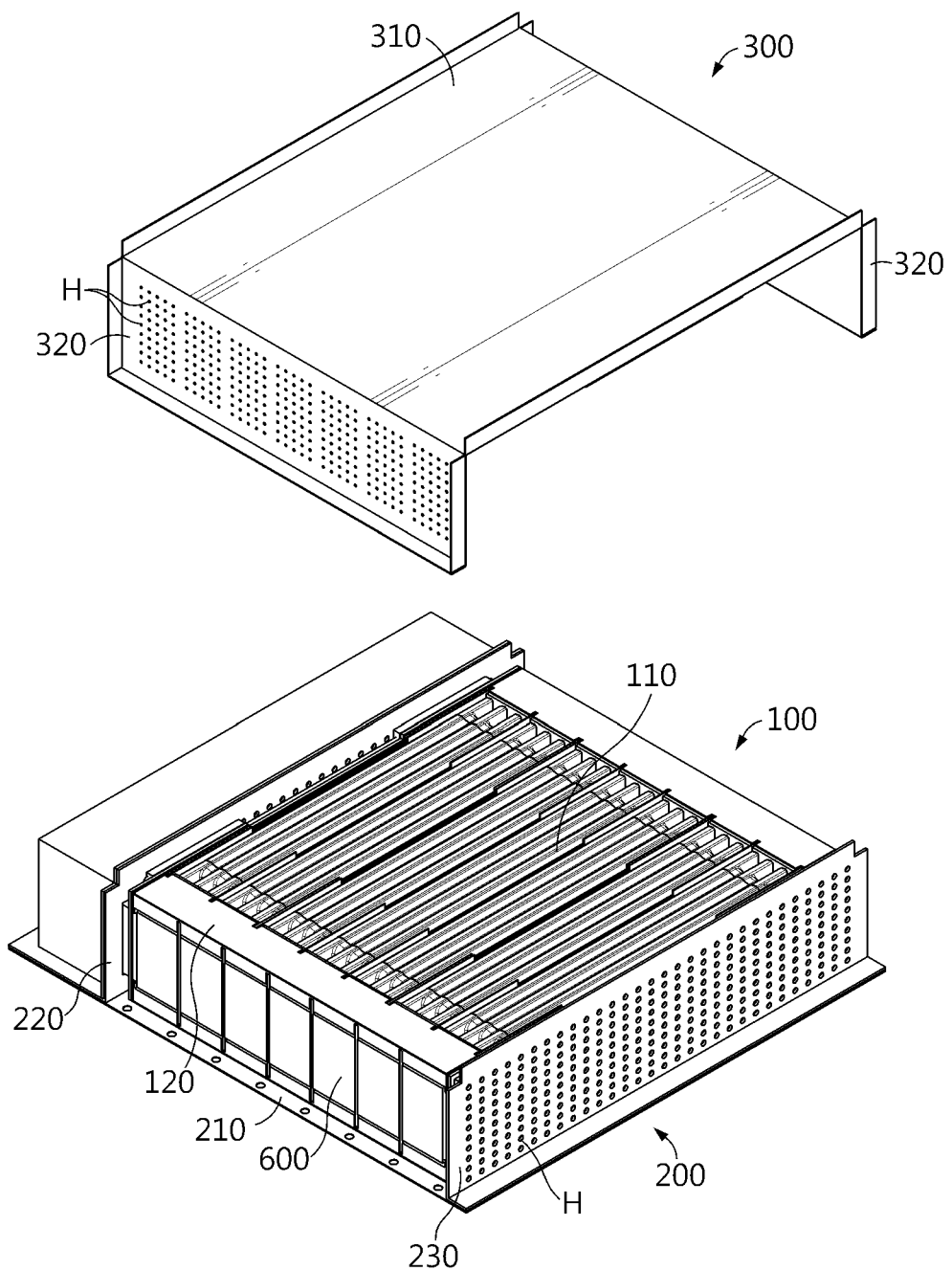
FIGS. 2 to 4 are exploded perspective views showing an ESS module according to an embodiment of the present disclosure.
Figure 3:
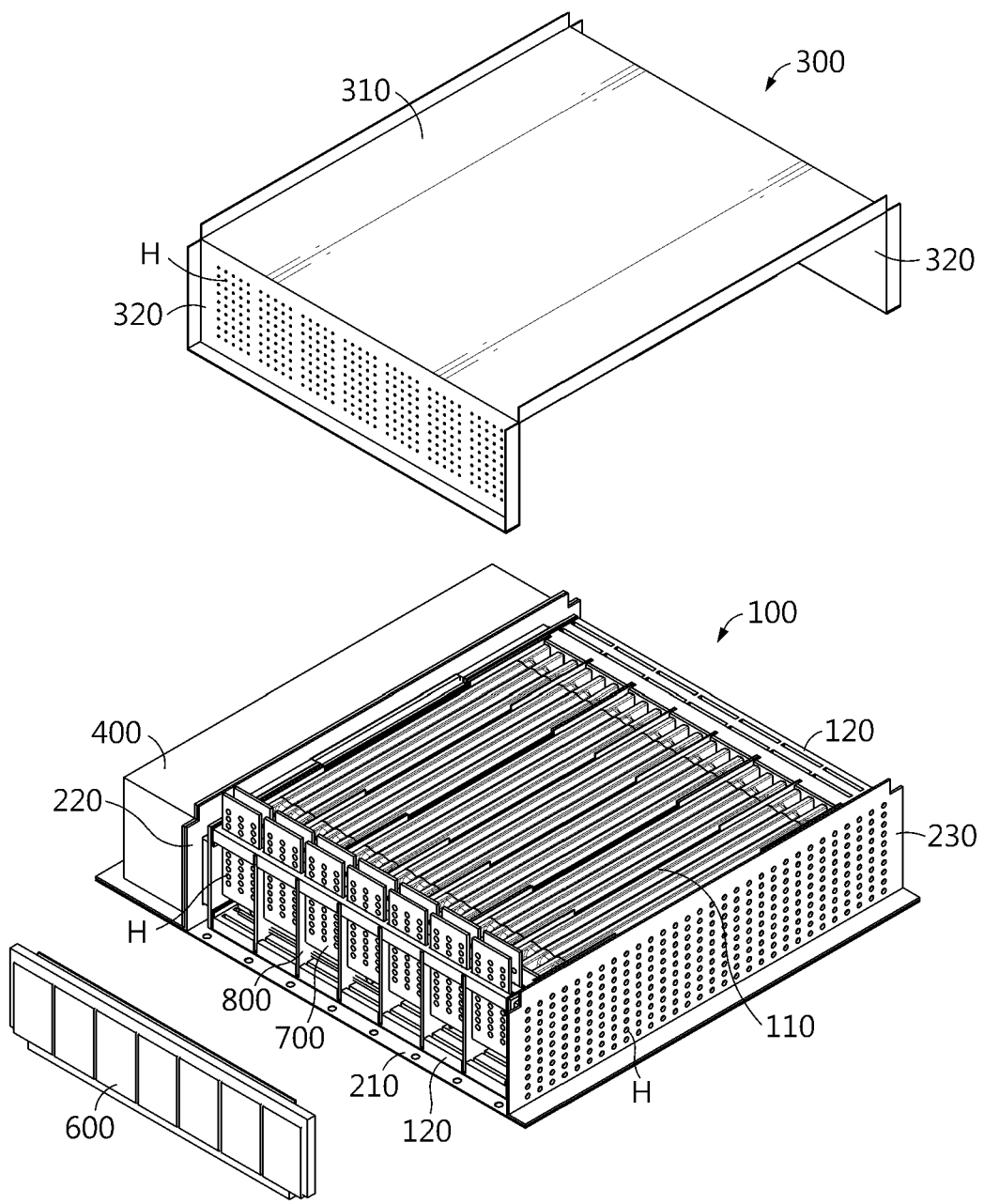

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Referring to FIGS. 1 to 4, an ESS module according to an embodiment of the present disclosure may include a cell stack assembly 100, a lower housing 200, an upper housing 300, a cooling fan block 400, a mesh barrier assembly 500, a mesh plate 600, a first mica plate 700 and a second mica plate 800.

Figure 5:
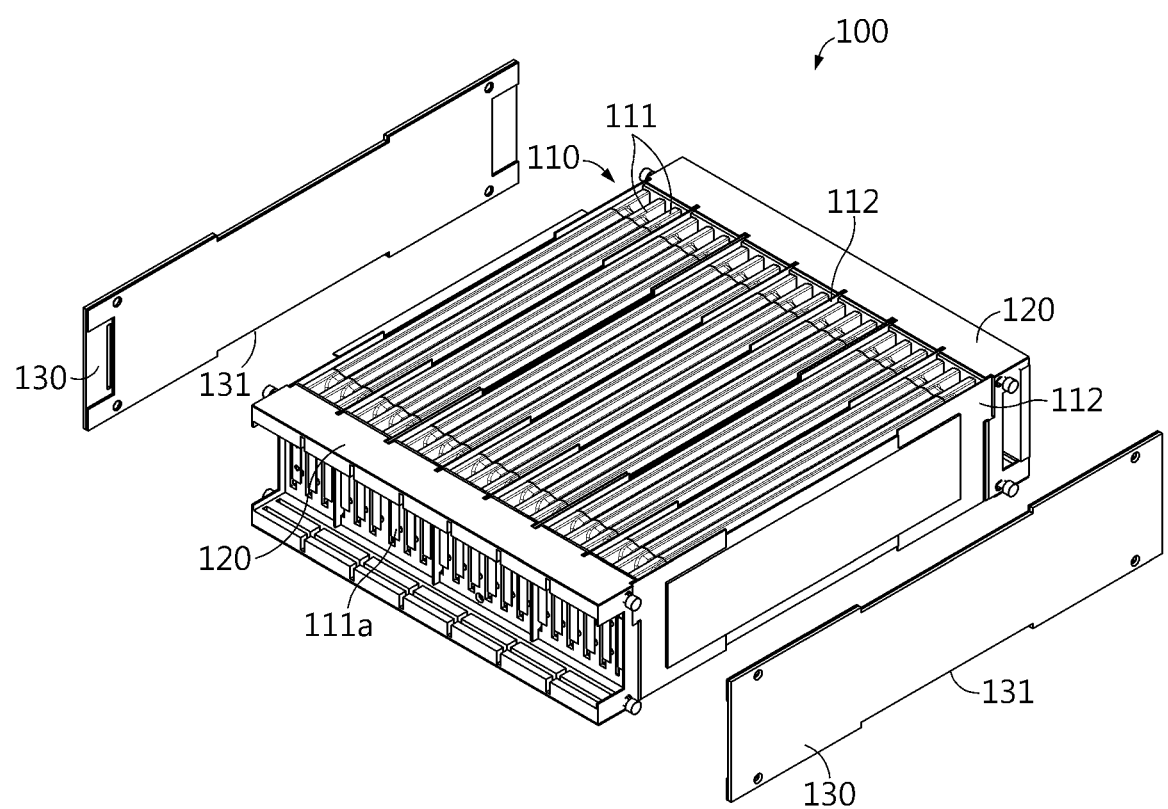
FIG. 5 is an exploded perspective view showing a cell stack assembly applied to the ESS module according to an embodiment of the present disclosure.
Figure 6:
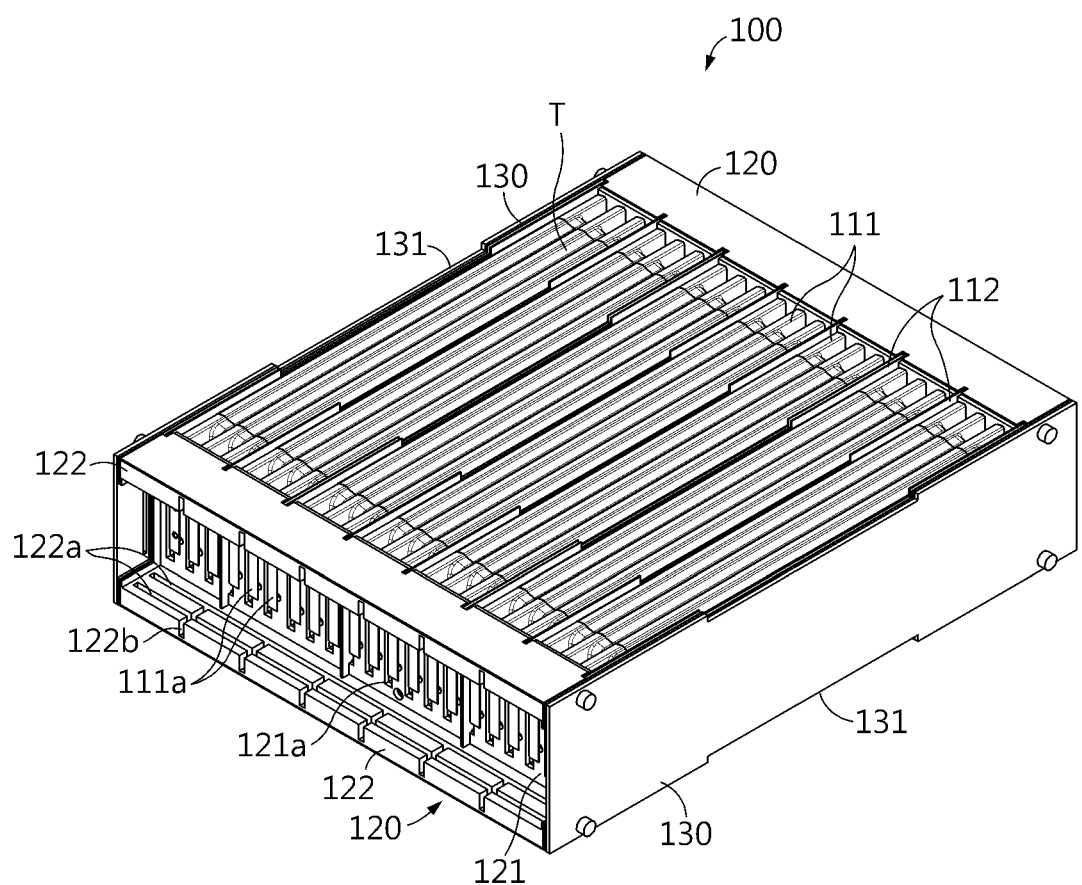
FIG. 6 is a perspective view showing the cell stack assembly applied to the ESS module according to an embodiment of the present disclosure in an assembled state.

Referring to FIGS. 5 and 6, the cell stack assembly 100 includes a cell stack 110, a bus bar frame 120 and a pressing plate 130.

The cell stack 110 is formed by stacking a plurality of battery cells 111 and a plurality of mica barrier assemblies 112. A pouch-type battery cell may be applied as the battery cell 111. The battery cell 111 includes a pair of electrode lead 111a respectively drawn out through both longitudinal sides. A sealing tape T for enhancing the sealing property of a pouch case of the battery cell 111 is attached to both widthwise side portions of the battery cell 111. As the sealing tape T is applied, the pouch-type battery cell 111 has better sealing property at both widthwise side portions of the pouch case, compared to sealing property of both longitudinal side portions thereof.

Due to the above characteristic of the pouch-type battery cell 111, when the internal pressure of the ESS module increases, an internal gas caused by venting is discharged along a direction in which the electrode lead 111a is drawn out, namely the longitudinal direction of the battery cell 111.

Referring to FIGS. 7 to 10 along with FIGS. 5 and 6, the mica barrier assembly 112 is provided between the battery cells 111 adjacent to each other and at an outermost side of the cell stack 110 to form a flow path along the stacking direction of the cell stack 110 at a temperature lower than a reference temperature and to block the flow path at a temperature equal to or higher than the reference temperature. Here, the flow path means a passage for movement for cooling air and for movement of gas when venting occurs.

When the temperature inside the ESS module is lower than the reference temperature and the flow path is formed accordingly, the movement of cooling air and the movement of the exhaust gas may be smoothly performed in the battery cells 111 along a direction from a front side to a rear side of the ESS module or a direction from a rear side to a front side thereof (parallel to the stacking direction of the battery cells 111).

On the contrary, when the temperature inside the ESS module is equal to or higher than the reference temperature and the flow path is blocked accordingly, the movement of air, gas and flame along the direction from the front side to the rear side of the ESS module or the direction from the rear side to the front side thereof (parallel to the stacking direction of the battery cells 111) is blocked.

That is, in a normal use state of the ESS module, the cooling air may be smoothly moved along a direction parallel to the stacking direction of the battery cells 111 and the mica barrier assemblies 112 through the flow path formed inside the cell stack assembly 100. In addition, even when an abnormal situation such as a short circuit occurs in some of the battery cells 111 of the ESS module and thus the temperature inside the battery cell 111 rises to reach a temperature at which venting occurs, the gas leaked out of the battery cells 111 may smoothly move along a direction parallel to the stacking direction of the battery cells 111 and the mica barrier assemblies 112 through the flow path.

However, if the temperature rises further to reach the reference temperature equal to or higher than a temperature at which some battery cells 111 cause thermal runaway, the flow path is blocked to prevent the flame generated due to the thermal runaway of some battery cells 111 from propagating to adjacent battery cells 111 inside the cell stack, thereby suppressing rapid propagation of the thermal runaway phenomenon.

In order to perform this function, the mica barrier assembly 112 has a length corresponding to the battery cell 111 and a slightly larger width than the battery cell 111, and is implemented to include a mica barrier 112a and a first expandable graphite sheet 112b.

Figure 7:
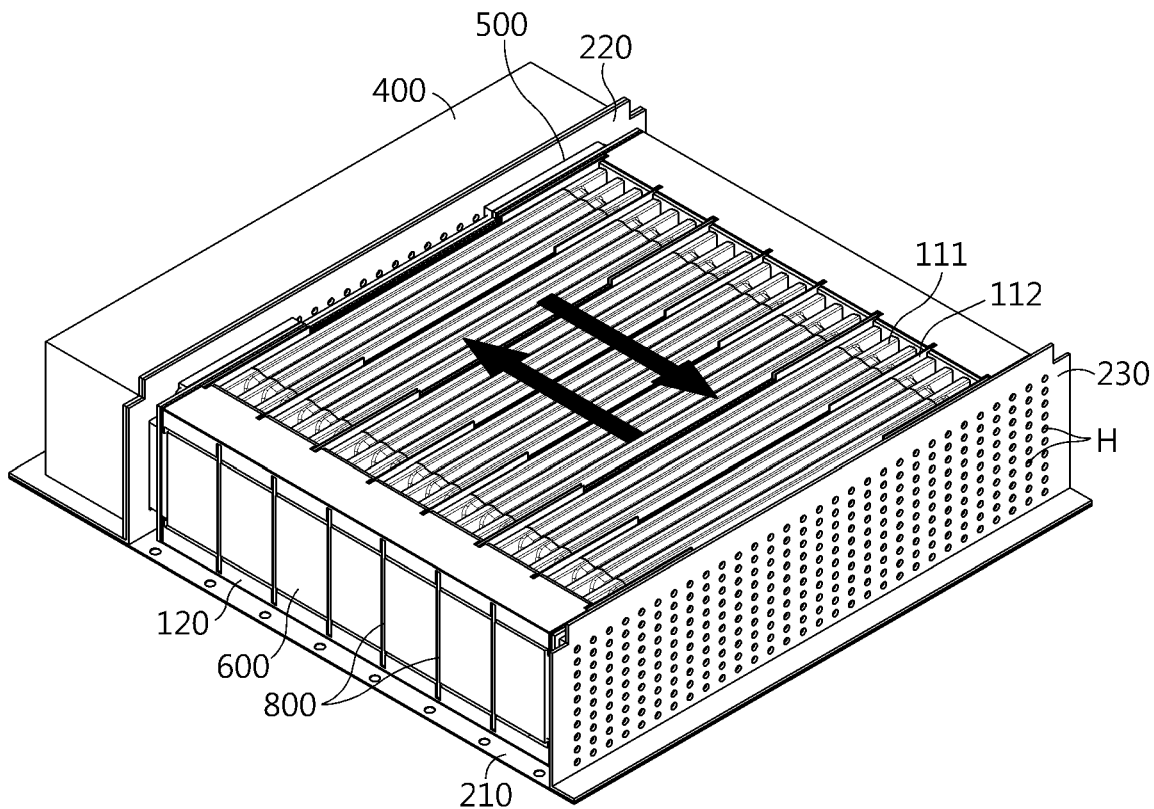
FIG. 7 is a diagram showing a state where an upper housing is removed from the ESS module according to an embodiment of the present disclosure, in which an expandable graphite is not expanded.
Figure 8:
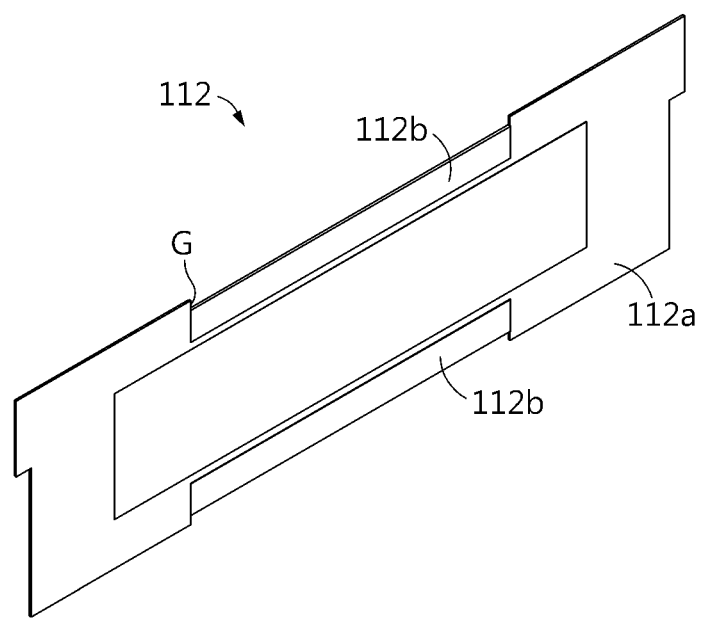
FIG. 8 is a diagram showing a mica plate assembly applied to the present disclosure, in which the expandable graphite is not expanded.

Referring to FIGS. 7 and 8, the mica barrier 112a is formed to have a width that slightly greater than that of the battery cell 111, thereby having a shape protruding further to the battery cell 111 at the top end and the bottom end of the cell stack 110. In addition, the mica barrier 112a has a pair of first flow path grooves G formed with a predetermined depth and length at a top end and/or a bottom end thereof in a widthwise direction. The first expandable graphite sheet 112b having a height lower than the depth of the first flow path groove G is attached inside the first flow path groove G. That is, the first expandable graphite sheet 112b fills just a part of the first flow path groove G, which creates an empty space in a part of the first flow path groove G, and this empty space functions as a flow path.

Mica constituting the mica barrier 112a is one of coarse materials constituting granite and has excellent electrical insulation properties and very little change in properties when heated. The mica maintains an insulation resistance of approximately 150 kV/mm even at high temperatures of 500° C. to 1000° C. and may be used as an asbestos substitute serving as an eco-friendly material. In addition, the mica has excellent flame retardancy and smoke-free properties during combustion or heating. Due to these characteristics, it is possible to prevent the thermal runaway phenomenon from propagating between adjacent battery cells 111 by inserting the mica barrier 112a made of mica material between the adjacent battery cells 111 when constructing the cell stack 110.

Figure 9:
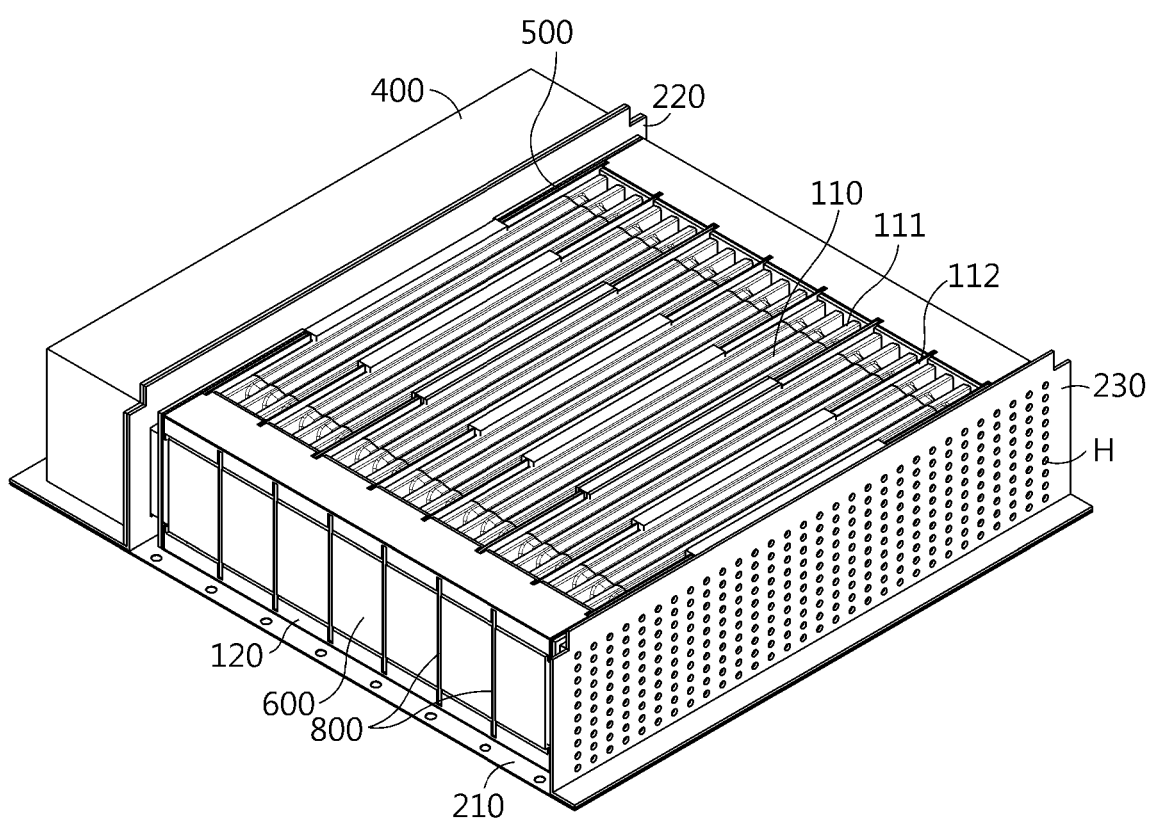
FIG. 9 is a diagram showing a state where the upper housing is removed from the ESS module according to an embodiment of the present disclosure, after which the expandable graphite is expanded.
Figure 10:
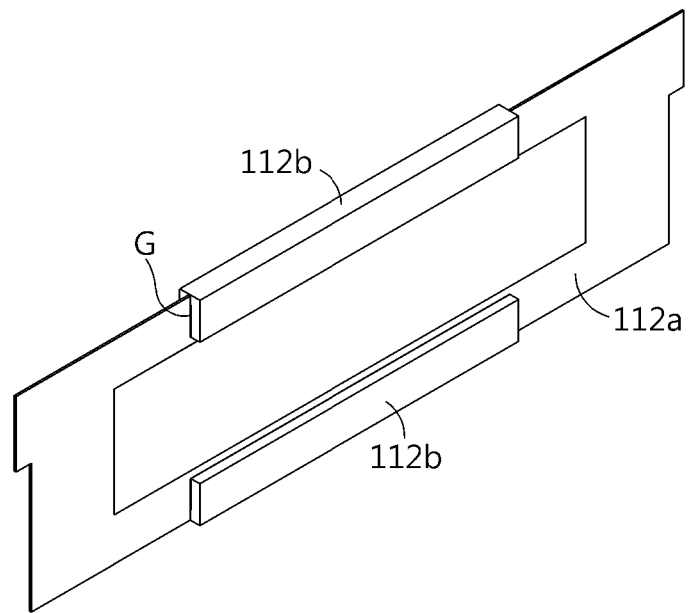
FIG. 10 is a diagram showing the mica plate assembly applied to the present disclosure, after the expandable graphite is not expanded.
Figure 11:
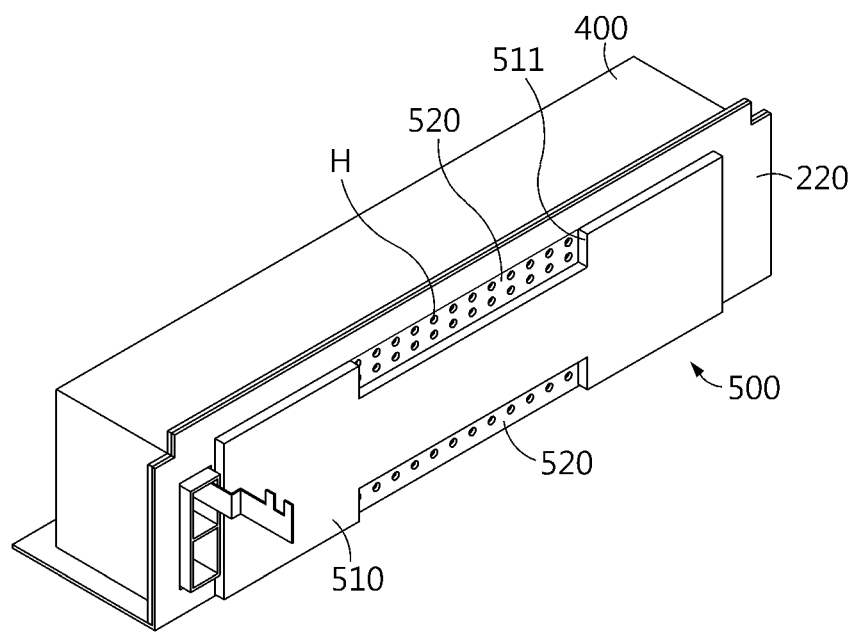
FIGS. 11 to 14 are diagrams showing that a flow path hole formed in the expandable graphite disappears as temperature rises, in the mesh plate assembly applied to the present disclosure.
Figure 12:
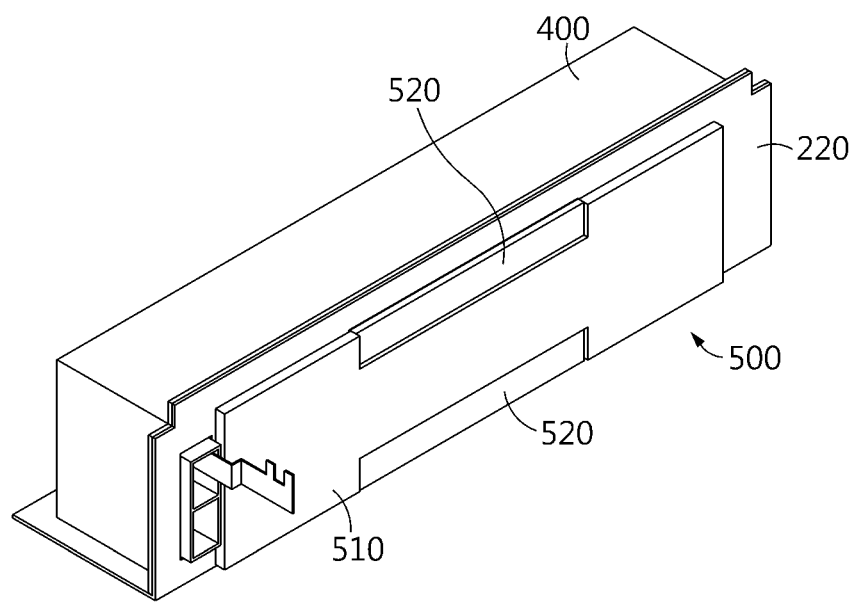
Figure 13:
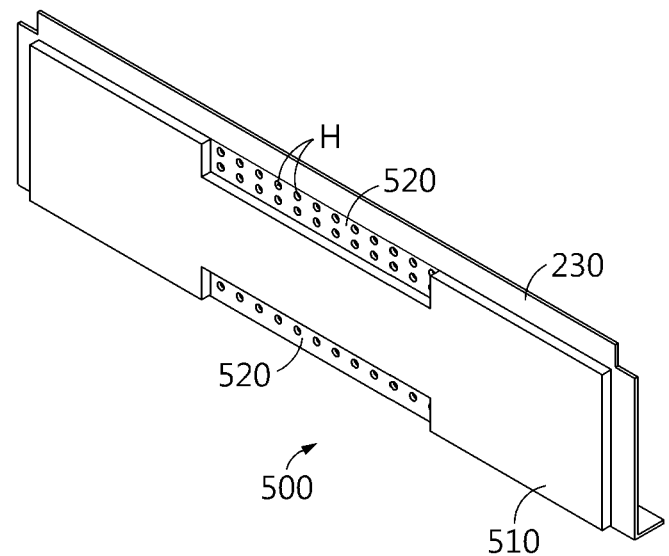
Figure 14:
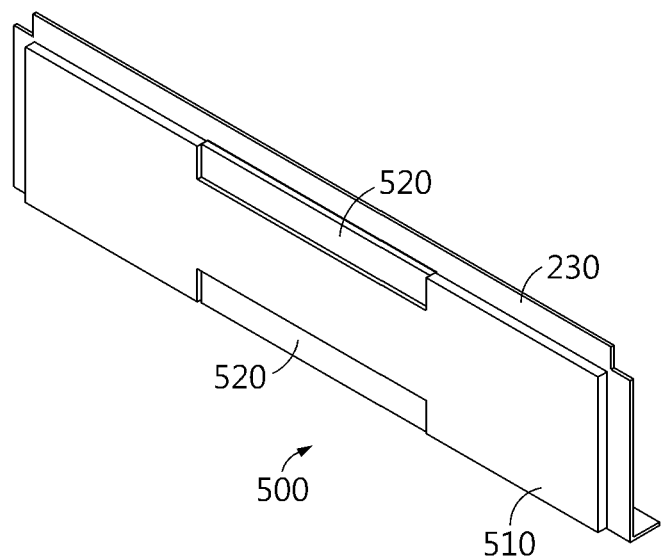

The expandable graphite powder of the first expandable graphite sheet 112b may control the temperature at which expansion occurs by controlling its composition, and in the present disclosure, the composition of the powder may be adjusted so that the first expandable graphite sheet 112b is expanded over a temperature at which the flame occurs due to the thermal runaway phenomenon. That is, as shown in FIGS. 9 and 10, the first expandable graphite sheet 112b is expanded at the reference temperature above the temperature at which the flame occurs, and fully fills the first flow path groove G. If the first flow path groove G is fully filled as above, the flow path formed along the stacking direction of the cell stack 110 inside the ESS module disappears, thereby completely preventing the movement of flame between adjacent battery cells 111.

Referring to FIGS. 5 and 6, the bus bar frame 120 is provided in a pair, and each bus bar frame 120 is coupled to the cell stack 110 in a direction in which the electrode lead 111a is drawn. The bus bar frame 120 includes a lead placing portion 121 and a pair of plate support portions 122.

The lead placing portion 121 includes a lead drawing slit 121a through which the electrode lead 111a passes. The electrode lead 111a is drawn out of the cell stack assembly 100 through the lead drawing slit 121a and is coupled to a bus bar (not shown) installed on the lead placing portion 121 by welding. The electrical connection relationship between the plurality of battery cells 111 is determined according to the number and polarity of electrode leads 111a coupled to one bus bar.

The plate support portion 122 has a shape extending from both widthwise ends of the lead placing portion 121 along a direction perpendicular to the lead placing portion 121, and includes a first fixing slit 122a and a second fixing slit 122b.

The first fixing slit 122a is formed at an inner surface of the plate support portion 122, but is formed along the longitudinal direction of the plate support portion 122. The first fixing slit 122a is formed at both inner surfaces of the pair of plate support portions 122 facing each other, and the first mica plate 700 for preventing flame from leaking out through both side portions of the ESS module is inserted into and fixed to the first fixing slit 122a (see FIG. 15). The first mica plate 700 will be described later in detail with reference to FIG. 15.

The second fixing slit 122b is formed at the inner surface of the plate support portion 122, but is formed along the widthwise direction of the plate support portion 122. That is, the second fixing slit 122b has a shape extending along a direction perpendicular to the first fixing slit 122a, and thus the first fixing slit 122a is divided as much as the number of the formed second fixing slits 122b. The second mica plate 800 for preventing flame from moving toward the front side and the rear side of the ESS module in the inner space of the bus bar frame 120 is inserted into and fixed to the second fixing slit 122b (see FIG. 16).

The second mica plate 800 will be described later in detail with reference to FIG. 16.

Referring to FIGS. 5 and 6, the pressing plate 130 is provided in a pair, and each pressing plate 130 is in close contact with both side portions of the cell stack 110 in the stacking direction to press the cell stack 110. That is, the cell stack 110 is disposed between the pair of pressing plates 130 in a pressurized state along the stacking direction, and the pressing plate 130 is fixed to the bus bar frame 120 to maintain the pressure on the cell stack 110.

The pressure of the pressing plate 130 onto the cell stack 110 improves the energy density of the cell stack 110, and also induces venting in the drawing direction of the electrode lead 111a when venting occurs due to a temperature rise of the battery cell 111. That is, as described above, the battery cell 111 may be a pouch-type battery cell, and in this case, because the sealing tape T is attached to both widthwise side portions of the battery cell 111, the gas and flame are guided to be discharged through the drawing portion of the electrode lead 111a, which has relatively poor sealing properties compared to both side portions.

Referring to FIGS. 1 to 4 again, the housing is configured to accommodate the cell stack assembly 100 and includes a lower housing 200 configured to cover a lower portion, a front portion and a rear portion of the cell stack assembly 100 and an upper housing 300 configured to cover an upper portion and both side portions of the cell stack assembly 100.

The lower housing 200 includes a lower plate 210 for covering the lower portion of the cell stack assembly 100, a front plate 220 for covering the front portion of the cell stack assembly 100, and a rear plate 230 for covering the rear portion of the cell stack assembly 100. The front plate 220 and the rear plate 230 have a plurality of flow path holes H communicating with the flow path formed in the cell stack 110.

The upper housing 300 includes an upper plate 310 for covering the upper portion of the cell stack assembly 100 and a pair of side plates 320 for covering both side portions of the cell stack assembly 100. The side plate 320 covers the bus bar frame 120, and also have a plurality of flow path holes H communicating with the inner space of the bus bar frame 120 formed to be surrounded by the lead placing portions 121 and the plate support portions 122.

The flow path holes H provided in the lower housing 200 and the upper housing 300 function as a movement path of a cooling air and a movement path of gas when venting occurs.

Referring to FIGS. 1 to 4 again, the cooling fan block 400 is installed outside the housing, and is installed adjacent to the front plate 220 and/or the rear plate 230. The internal space of the cooling fan block 400 communicates with the flow path holes H formed in the front plate 220 and/or the rear plate 230. In addition, a cooling fan (not shown) may be provided inside the cooling fan block 400, and the cooling air is moved from the front plate 220 toward the rear plate 230 or from the rear plate 230 toward the front plate 220 by driving the cooling fan.

Figure 4:
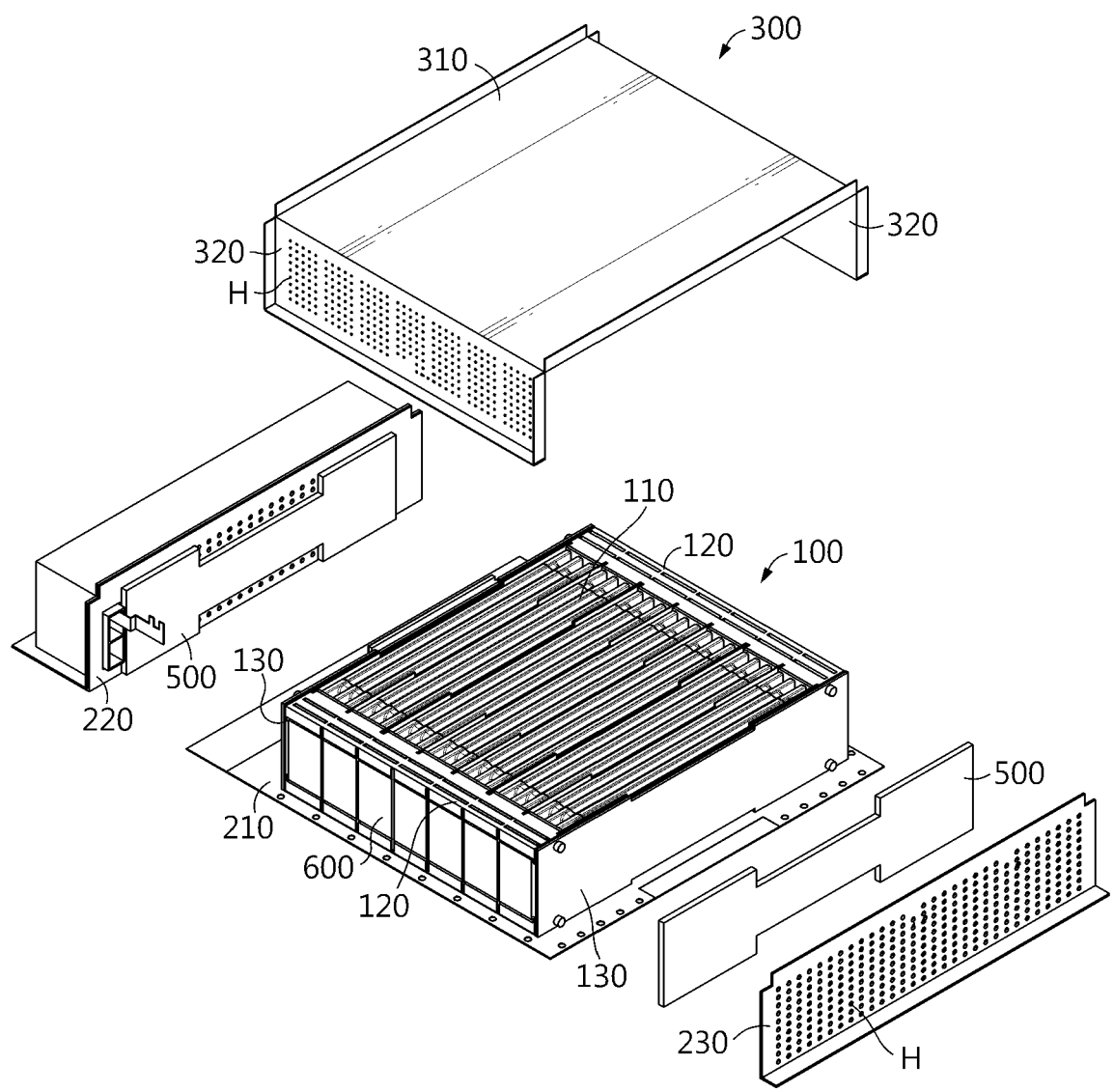

Next, referring to FIGS. 11 to 14 along with FIG. 4, the mesh barrier assembly 500 is interposed between the front plate 220 and the cell stack assembly 100 and between the rear plate 230 and the cell stack assembly 100, and functions to pass air and gas while blocking flame.

The mesh barrier assembly 500 is implemented to include a mesh barrier 510 and a second expandable graphite sheet 520. The mesh barrier 510 is a mesh-type plate in which a plurality of fine pores are formed to pass air for cooling and gas generated by venting but minimize the passage of flame, and has a coupling groove 511 formed with a predetermined width and length on at least one of a top end and a bottom end thereof.

The second expandable graphite sheet 520 is coupled to the mesh barrier 510 while filling the coupling groove 511, and has a plurality of flow path holes H. The flow path hole H formed in the second expandable graphite sheet 520 is provided at a location corresponding to the flow path hole H formed in the front plate 220 and the rear plate 230 described above.

The second expandable graphite sheet 520 is expanded at the reference temperature or higher, like the first expandable graphite sheet 112b described above. When the second expandable graphite sheet 520 is expanded, the plurality of flow path holes H formed in the second expandable graphite sheet 112b disappear, and accordingly the flame ejected along the front side and/or the rear side of the cell stack assembly 100 is not be able to pass through the second expandable graphite sheet 112b.

Next, referring to FIGS. 1 to 4, the mesh plate 600 is provided in a pair, and each mesh plate 600 is interposed between the side plate 320 and the cell stack assembly 100. The mesh plate 600 is a mesh-type plate in which a plurality of fine pores are formed to pass air for cooling and gas generated by venting but minimize the passage of flame, like the mesh barrier 510 described above.

As the mesh plate 600 is applied, the gas ejected along the longitudinal direction of the battery cell 111 is smoothly discharged to the outside of the ESS module, but the flame ejected along the longitudinal direction of the battery cell 111 may be exposed to the outside of the ESS module to the minimum.

Figure 15:
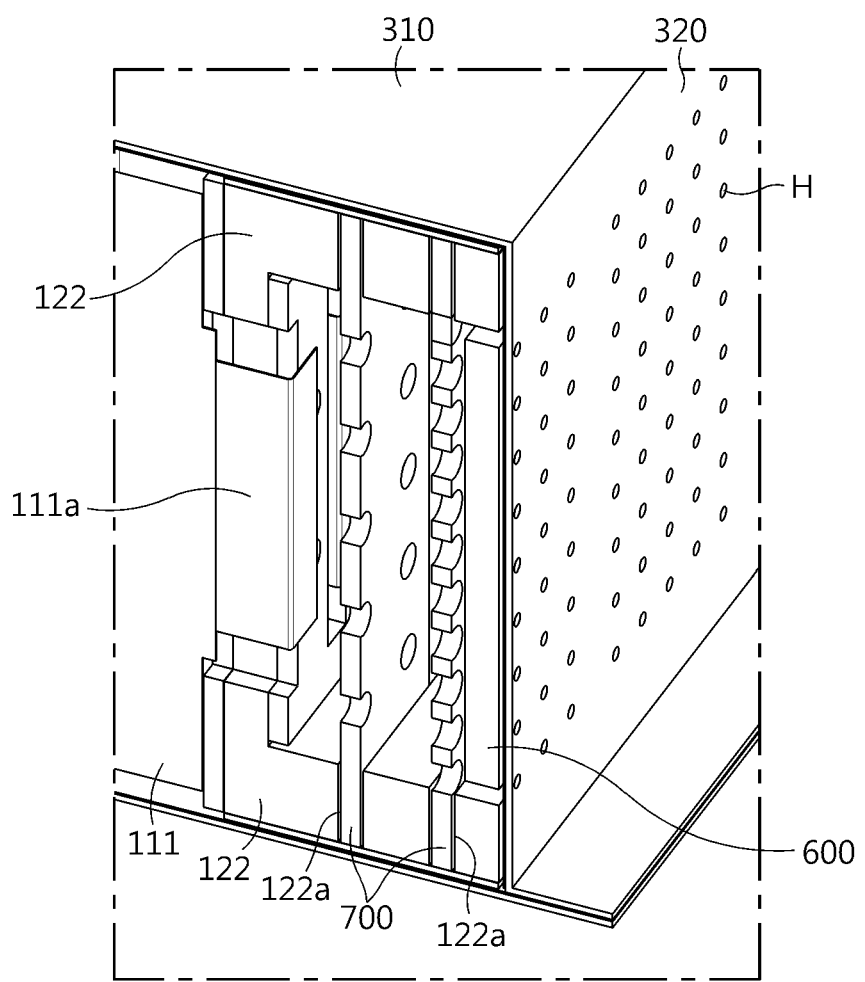
FIG. 15 is a cross-sectioned view.
Figure 16:
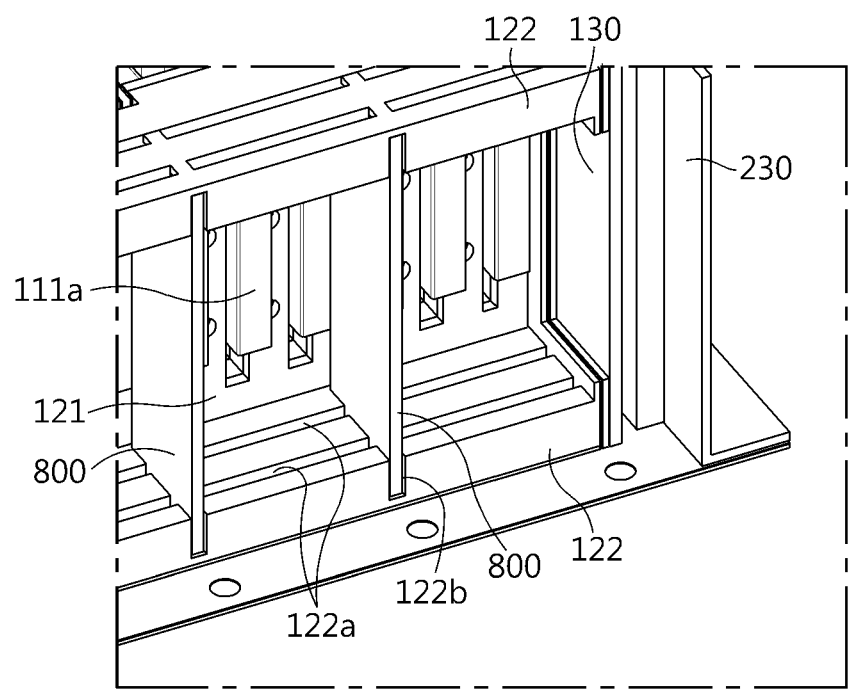
FIG. 16 is a diagram showing an inner structure, observed from a side of the ESS module according to an embodiment of the present disclosure.

Next, referring to FIGS. 15 and 16, the first mica plate 700 is interposed between the cell stack 110 and the mesh plate 600. The first mica plate 700 is inserted into and fixed to the first fixing slit 122a formed at the plate support portion 122. The first mica plate 700 is arranged in parallel to the mesh plate 600, and has a plurality of flow path holes H for smoothly discharging the gas that is intensively ejected along the drawing direction of the electrode lead 111a.

The first mica plate 700 may be installed in duplicate to minimize that the flame is ejected to the outside of the ESS module along the drawing direction of the electrode lead 111a. That is, the first mica plate 700 may form two rows of barriers spaced apart from each other along the drawing direction of the electrode lead 111a.

The second mica plate 800 is disposed between the cell stack 110 and the mesh plate 600 to be perpendicular to the mesh plate 600. The second mica plate 800 is inserted into and fixed to the second fixing slit 122b formed at the plate support portion 122. The second mica plate 800 is provided in plural. The plurality of the second mica plates 800 are installed to be spaced apart from each other from the front side of the ESS module toward the rear side thereof to partition the inner space of the bus bar frame 120, namely the space surrounded by the lead placing portion 121 and the pair of plate support portions 122.

The second mica plate 800 prevents the flame ejected along the drawing direction of the electrode lead 111a from moving along the direction perpendicular to the drawing direction of the electrode lead 111a in the inner space of the bus bar frame 120.

Meanwhile, in the present disclosure, the first mica plate 700 and/or the second mica plate 800 are applied to maximize the effect of preventing the flame exposure by the mesh plate 600. Thus, the ESS module according to the present disclosure may also have a structure in which only the mesh plate 600 is applied except for the first mica plate 700 and/or the second mica plate 800.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. An ESS (Energy Storage System) module, comprising:
   a cell stack assembly including a cell stack formed by stacking a plurality of battery cells and a plurality of mica barrier assemblies and a pair of bus bar frames coupled to side portions of the cell stack assembly; and
   a housing configured to accommodate the cell stack assembly and having a plurality of flow path holes formed at locations corresponding to a front side, a rear side and the side portions of the cell stack assembly,
   wherein one of the mica barrier assemblies is provided between adjacent battery cells and one of the mica barrier assemblies is provided at an outermost side of the cell stack, and
   wherein each of the mica barrier assemblies includes a flow path along a stacking direction of the cell stack and a thermally expandable member disposed in at least a part of the flow path.

2. The ESS module according to claim 1, wherein each of the mica barrier assemblies includes a mica barrier having a flow path groove formed on at least one of a top end and a bottom end thereof,
   wherein the thermally expandable member is a first expandable graphite sheet configured to fill a part of the flow path groove, the first expandable graphite sheet being expanded at a temperature equal to or higher than the reference temperature to fully fill the flow path groove.

3. The ESS module according to claim 1, wherein the battery cell is a pouch-type battery cell and has sealing tapes attached to both widthwise side portions thereof.

4. The ESS module according to claim 3, further comprising:
a pair of pressing plates provided in close contact with the side portions of the cell stack assembly in the stacking direction to press the cell stack assembly and fixed to the pair of bus bar frames.

5. The ESS module according to claim 1, wherein the housing includes:
a lower housing having a lower plate configured to cover a lower portion of the cell stack assembly, a front plate configured to cover a front portion of the cell stack assembly and a rear plate configured to cover a rear portion of the cell stack assembly; and
an upper housing having an upper plate configured to cover an upper portion of the cell stack assembly and a pair of side plates configured to cover the side portions of the cell stack assembly.

6. The ESS module according to claim 5, further comprising:
a mesh barrier assembly interposed between the front plate and the cell stack assembly and between the rear plate and the cell stack assembly.

7. The ESS module according to claim 6, wherein the mesh barrier assembly includes:
a mesh barrier having a coupling groove formed on at least one of a top end and a bottom end thereof; and
a second expandable graphite sheet coupled to the mesh barrier while filling the coupling groove, the second expandable graphite sheet having a plurality of flow path holes and being expanded at a temperature equal to or higher than the reference temperature so that the plurality of flow path holes disappear.

8. The ESS module according to claim 5, further comprising:
a mesh plate interposed between each of the side plates and the cell stack assembly.

9. The ESS module according to claim 8, further comprising:
a first mica plate interposed between the cell stack and each of the mesh plates and arranged in parallel to each of the mesh plates, the first mica plate having a plurality of flow path holes.

10. The ESS module according to claim 9, further comprising:
a second mica plate disposed between the cell stack and each of the mesh plates and disposed perpendicular to each of the mesh plates to partition an inner space of the bus bar frame.

11. An ESS pack, comprising a plurality of ESS modules according to claim 1.

* * * * *